(12) United States Patent
Cooper

(10) Patent No.: US 6,788,813 B2
(45) Date of Patent: Sep. 7, 2004

(54) SYSTEM AND METHOD FOR EFFECTIVELY PERFORMING A WHITE BALANCE OPERATION

(75) Inventor: Ted J Cooper, Sunnyvale, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 721 days.

(21) Appl. No.: 09/809,925

(22) Filed: Mar. 15, 2001

(65) Prior Publication Data

US 2002/0131635 A1 Sep. 19, 2002

Related U.S. Application Data

(60) Provisional application No. 60/244,107, filed on Oct. 27, 2000.

(51) Int. Cl.[7] .............................. G06K 9/00; H04N 1/46
(52) U.S. Cl. ....................................... 382/167; 358/516
(58) Field of Search ................................. 358/501, 504, 358/505, 509, 514, 515, 516, 518; 382/162, 165, 167; 348/68, 222, 227; 396/63, 157

(56) References Cited

U.S. PATENT DOCUMENTS

| | | | | |
|---|---|---|---|---|
| 5,047,847 A | * | 9/1991 | Toda et al. ................... 348/68 |
| 5,386,229 A | * | 1/1995 | Suzuki ..................... 348/227.1 |
| 5,526,058 A | * | 6/1996 | Sano et al. ................. 348/647 |
| 5,568,195 A | * | 10/1996 | Suzuki ..................... 348/227.1 |
| 5,606,365 A | * | 2/1997 | Maurinus et al. ........ 348/222.1 |
| 5,732,293 A | * | 3/1998 | Nonaka et al. ............. 396/157 |
| 6,614,996 B2 | * | 9/2003 | Okisu et al. .................. 396/63 |

* cited by examiner

Primary Examiner—Andrew W. Johns
Assistant Examiner—Amir Alavi
(74) Attorney, Agent, or Firm—Gregory J. Koerner; Simon & Koerner LLP

(57) ABSTRACT

A system and method for effectively performing a white balance operation preferably includes an electronic camera device that captures image data using a image sensor device. A color manager may then analyze the image data to selectively locate one or more neutral areas in the image data. The color manager may analyze the neutral areas to determine one or more associated color values, and then responsively produce one or more composite color values for the image data by utilizing the individual color values of the neutral areas. From the foregoing composite color values, the color manager may derive one or more color correction values which the camera device may then apply to color channel amplifiers of the camera device to complete the white balance operation. However, if no neutral areas are located in the image data, the color manager may then analyze the image data to selectively locate one or more memory color areas in the image data. The color manager may analyze a memory color area to determine one or more memory color values corresponding to the memory color area. The color manager may then utilize the memory color values of the memory color area to reference a color table to thereby locate known memory color values for a closest matching known memory color. By substituting the known memory color values from the color table for the original memory color values of the memory color area, the color manager may derive one or more color correction values which the camera device may then apply to color channel amplifiers of the camera device to complete the white balance operation.

64 Claims, 11 Drawing Sheets

SYSTEM AND METHOD FOR EFFECTIVELY PERFORMING A WHITE BALANCE OPERATION

CROSS-REFERENCE TO RELATED APPLICATIONS

This application relates to, and claims priority in, U.S. Provisional Patent Application Serial No. 60/244,107, entitled "Color Segmentation As An Aid To DSC White Balancing" that was filed on Oct. 27, 2000. The foregoing related application is commonly assigned, and is hereby incorporated by reference.

BACKGROUND SECTION

1. Field of the Invention

This invention relates generally to techniques for manipulating data, and relates more particularly to a system and method for effectively performing a white balance operation in the field of digital imaging.

2. Description of the Background Art

Implementing effective methods for manipulating data is a significant consideration for designers and manufacturers of contemporary electronic devices. However, effectively manipulating data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively captures and manipulates digital image data may benefit from an effective implementation because of the large amount and complexity of the digital data involved.

In certain electronic cameras that capture digital image data, a white balancing operation may be required. In practice, the human visual system does not perceive the same amount of light and the same colors that an electronic camera captures as image data. White balancing operations therefore adjust the image data captured by the electronic camera, so that a resultant captured image appears the same as the image that was originally perceived by the human eye.

Due to growing demands on system resources and substantially increasing data magnitudes, it is apparent that developing new techniques for manipulating data is a matter of concern for related electronic technologies. Therefore, for all the foregoing reasons, developing effective systems for manipulating data remains a significant consideration for designers, manufacturers, and users of contemporary electronic devices.

SUMMARY

In accordance with the present invention, a system and method are disclosed for effectively performing a white balance operation. In one embodiment, initially, a camera device may preferably set amplifier gains of red, green, and blue channel amplifiers to unity gain. Then, the camera device may preferably capture image data using a set of image sensors in a capture subsystem for one specific type of illumination that closely approximates equal energy illumination for the chosen set of image sensors.

Next, a segmentation subroutine of a color manager may preferably search for selected neutral areas in the captured image data according to pre-determined criteria, and the color manager may preferably determine whether qualified neutral areas exist in the image data. If the color manager identifies one or more neutral areas in the image data, then the color manager may preferably analyze the individual neutral areas to thereby determine relevant information such as a total pixel count for each neutral area and one or more representative color values for each neutral area.

In certain embodiments, the foregoing color values may preferably include a ratio of the red and green pixel values (a R/G value), and a ratio of the blue and green pixel values (a B/G value) that represent corresponding chromaticity components. However, it should be noted that R/G and B/G are just one example of how chromaticity may be measured, and other methods of representing chromaticity are equally within the scope of the present invention.

Next, the color manager may preferably determine a composite color value that represents combined color information for the neutral areas of the image data. The color manager may then preferably determine one or more appropriate color correction factors based upon the foregoing composite color values, to thereby adjust white-balance parameters of the camera device. Finally, the camera device may preferably apply the foregoing color correction factors to appropriate camera functionality (such as adjusting the amplifier gains of the red, green, and blue channel amplifiers) to thereby compensate for color cast artifacts in the image data.

In certain embodiments, electronic cameras of different primary colors (for example, cyan, yellow, and magenta) are also contemplated for utilization with the present invention. In addition, image sensors of more than three channels are likewise contemplated for utilization with the present invention. For example, electronic cameras that function with red, green, blue, and teal channels may be available in the near future.

In the event that the color manager fails to locate any neutral areas in the image data, the color manager may then preferably search for one or more potential memory color areas in the image data by utilizing any appropriate and effective techniques. For example, the color manager may identify regions in the image data that are above a certain memory color size threshold. If no potential memory color area is located in the image data, then the color manager may preferably utilize appropriate selectable system defaults to provide color correction factors for performing a white-balancing procedure for the camera device. For example, the color manager may utilize manufacturer default settings or may utilize values from one or more preceding white-balancing procedures in the camera device.

If a potential memory color area is located in the image data, then the color manager may preferably analyze the memory color area to obtain various types of relevant information. For example, the color manager may determine one or more memory color values for the potential memory color area. In certain embodiments, the foregoing memory color values may preferably include a R/G value and a B/G value.

The color manager may then preferably compare the foregoing memory color values to a color table with known color values for various memory colors under various illuminants. The color manager may preferably determine whether the foregoing memory color values of the potential memory color area are within a pre-determined range of a known color value for a particular memory color under a particular illuminant.

If the memory color values of the potential memory color area are within a pre-determined range of a known color value, then the color manager may preferably utilize various types of validity criteria to verify that the potential memory color area is a valid choice. The foregoing validity criteria may include any effective means for evaluating a potential memory color area. For example, the color manager may perform various memory color location tests, such as ensuring that a potential sky memory color area is near the top of the corresponding image. In addition, the color manager may also perform various illuminant tests, such as ensuring that a potential outdoor memory color is not matched with an indoor illuminant such as fluorescent lighting. The color manager may thus make a final identification of a memory color area in the image data only after a potential memory color area passes all validity testing procedures.

The color manager may then advantageously determine one or more correction factors based upon the identified memory color area by utilizing any appropriate and effective means. In certain embodiments, the color manager may preferably associate the identified memory color area with a closest matching known memory color from the foregoing color tables. In accordance with the present invention, the color manager may then reference the color tables to determine one or more known color values for the closest matching known memory color.

The color manager may then substitute the foregoing known color values for the closest matching known memory color to calculate the one or more correction values, instead of utilizing the original color values of the identified memory color area from the image data. Finally, the camera device may preferably apply the foregoing color correction factors to appropriate camera functionality (such as adjusting the amplifier gains of the red, green, and blue channel amplifiers) to thereby compensate for color cast artifacts in the image data. The present invention thus provides an improved system and method for effectively performing a white balance operation.

DETAILED DESCRIPTION

The present invention relates to an improvement in data manipulation techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively performing a white balance operation, and preferably includes an electronic camera device that captures image data using a image sensor device. A color manager may then analyze the image data to selectively locate one or more neutral areas in the image data. The color manager may analyze the neutral areas to determine one or more associated color values, and then responsively produce one or more composite color values for the image data by utilizing the individual color values of the neutral areas. From the foregoing composite color values, the color manager may derive one or more color correction values which the camera device may then apply to color channel amplifiers of the camera device to complete the white balance operation.

However, if no neutral areas are located in the image data, the color manager may then analyze the image data to selectively locate one or more memory color areas in the image data. The color manager may analyze a memory color area to determine one or more memory color values corresponding to the memory color area. The color manager may then utilize the memory color values of the memory color area to reference a color table to thereby locate known memory color values for a closest matching known memory color. By substituting the known memory color values from the color table for the original memory color values of the memory color area, the color manager may advantageously derive one or more color correction values which the camera device may then apply to color channel amplifiers of the camera device to complete the white balance operation.

Figure 1:
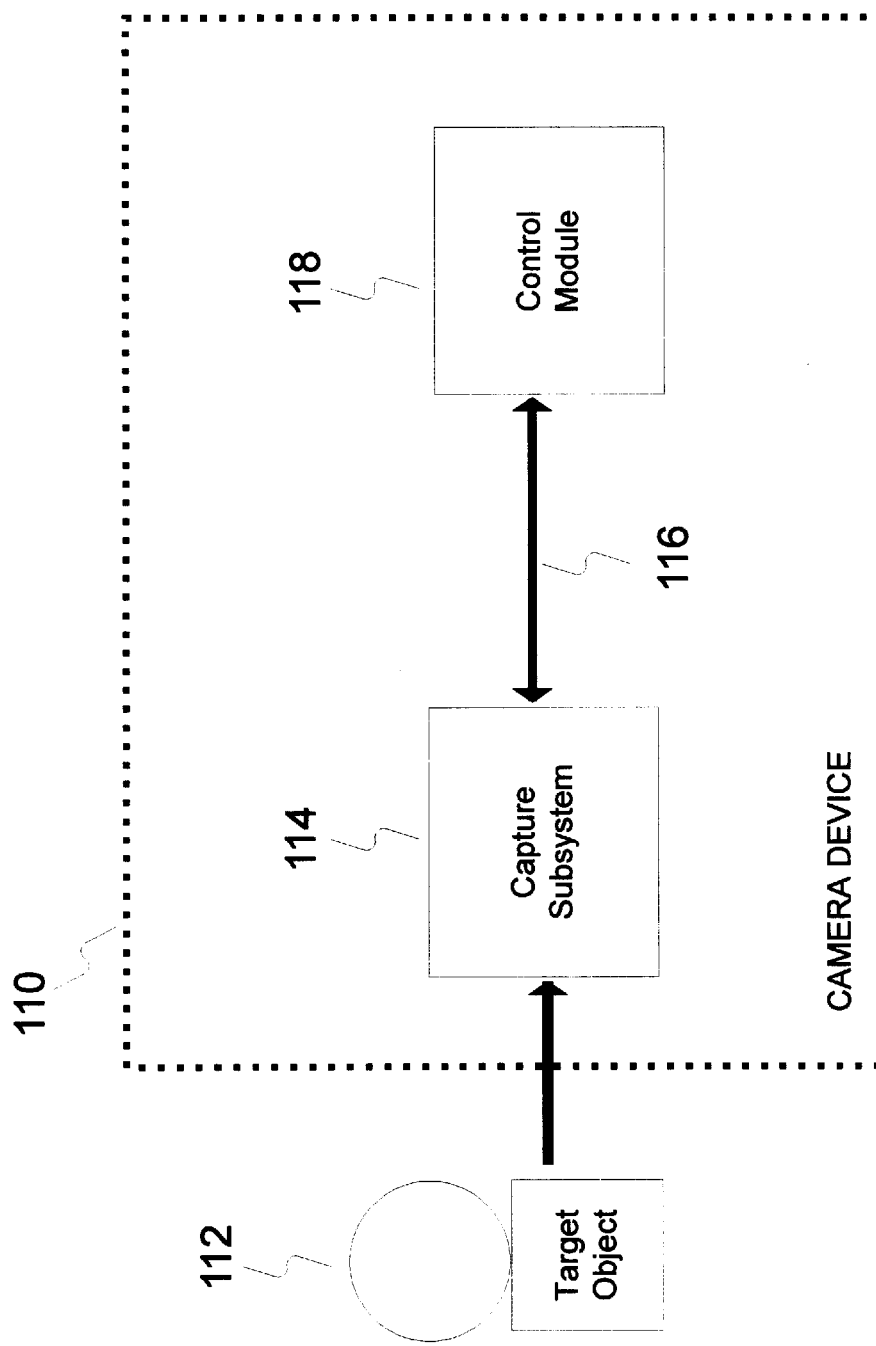
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a target object 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may readily be implemented as a scanner device or a video camera device.

In the FIG. 1 embodiment, once a system user has focused capture subsystem 114 on target object 112 and requested camera device 110 to capture image data corresponding to target object 112, then control module 118 may preferably instruct capture subsystem 114 via system bus 116 to capture image data representing target object 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
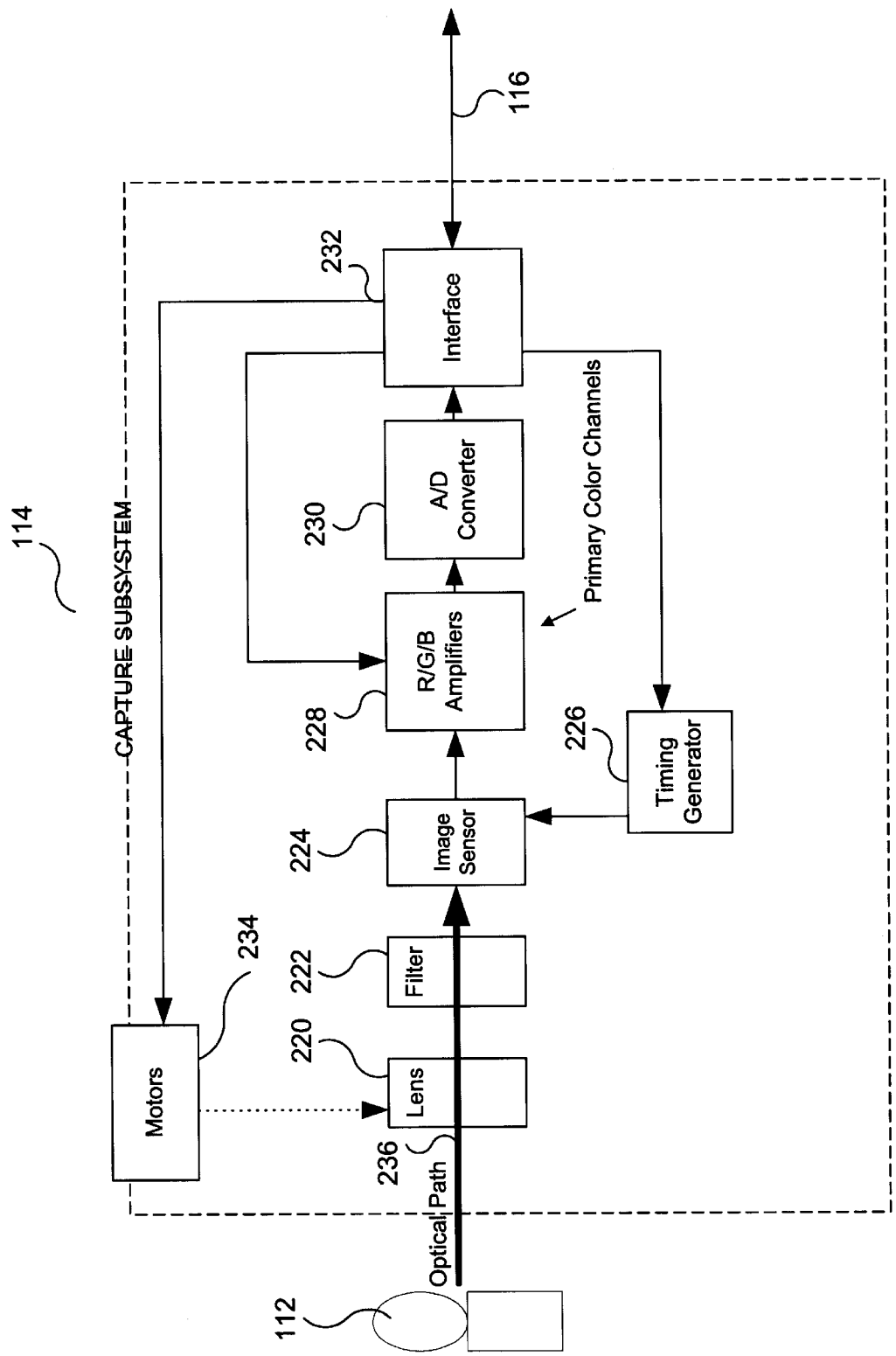
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, imaging device 114 preferably comprises, but is not limited to, a lens 220 having an iris (not shown), a filter 22, an image sensor 224, a timing generator 226, red, green, and blue amplifiers 228, an analog-to-digital (A/D) converter 230, an interface 232, and one or more motors 234 to adjust the focus of lens 220. In alternate embodiments, capture subsystem 114 may readily include various other components in addition to, or instead of, those components discussed in conjunction with the FIG. 2 embodiment.

In the FIG. 2 embodiment, capture subsystem 114 may preferably capture image data corresponding to target object 112 via reflected light impacting image sensor 224 along optical path 236. Image sensor 224, which may preferably include a charged-coupled device (CCD), may responsively generate a set of image data representing the target object 112. The image data may then be routed through red, green, and blue amplifiers 228, A/D converter 230, and interface 232. Interface 232 may preferably include separate interfaces for controlling ASP 228, motors 234, timing generator 226, and red, green, and blue amplifiers 228. From interface 232, the image data passes over system bus 116 to control module 118 for appropriate processing and storage. Other types of image capture sensors, such as CMOS or linear arrays are also contemplated for capturing image data in conjunction with the present invention.

Figure 3:
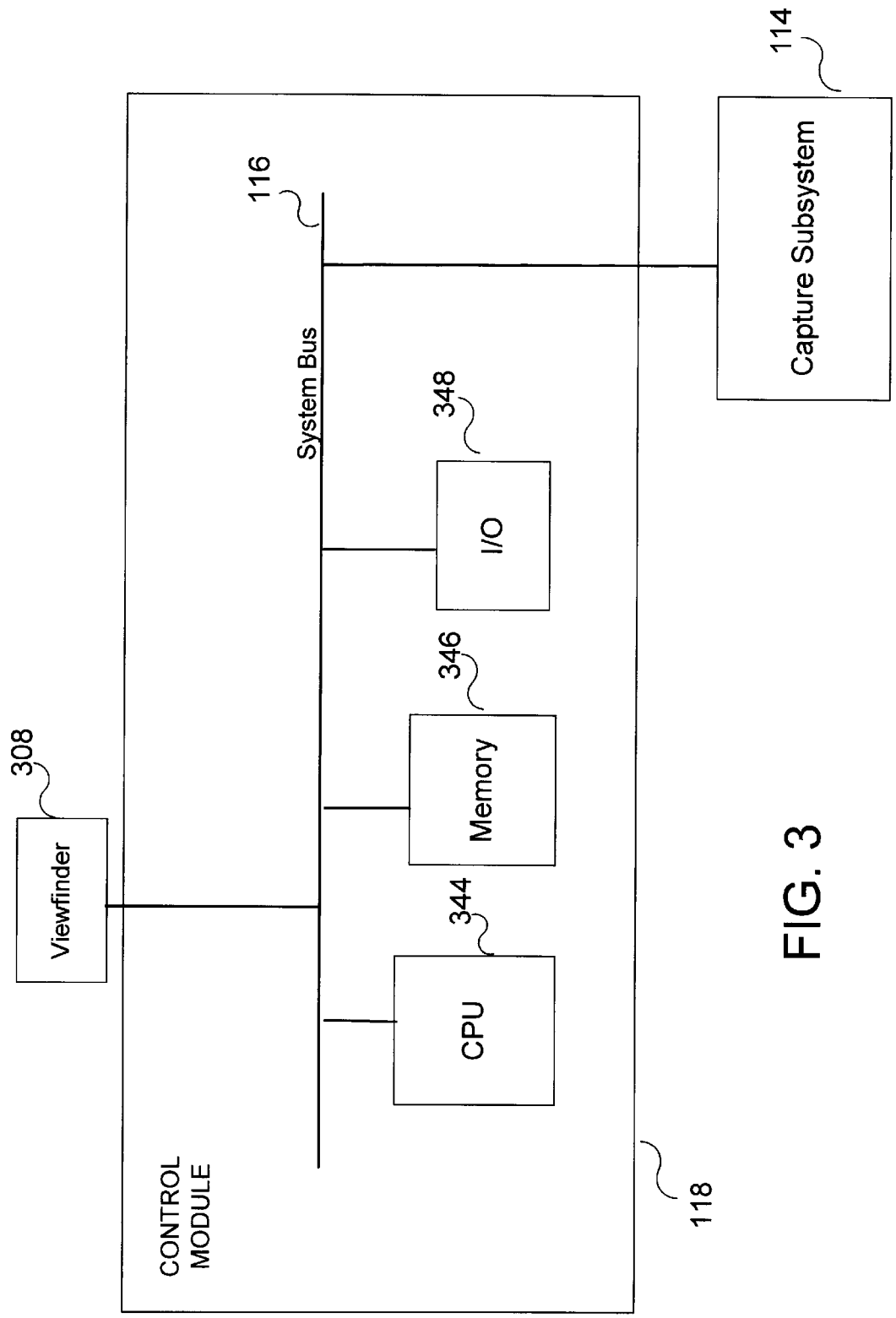
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and one or more input/output interface(s) (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may preferably be implemented to include any appropriate microprocessor device. Alternately, CPU 344 may be implemented using any other appropriate technology. For example, CPU 344 may be implemented to include certain application-specific integrated circuits (ASICS) or other appropriate electronic devices. Memory 346 may preferably be implemented as one or more appropriate storage devices, including, but not limited to, read-only memory, random-access memory, and various types of non-volatile memory, such as floppy disc devices, hard disc devices, or flash memory. I/O 348 preferably may provide one or more effective interfaces for facilitating bi-directional communications between camera device 110 and any external entity, including a system user or another electronic device. I/O 348 may be implemented using any appropriate input and/or output devices. The operation and utilization of control module 118 is further discussed below in conjunction with FIGS. 4 through 11.

Figure 4:
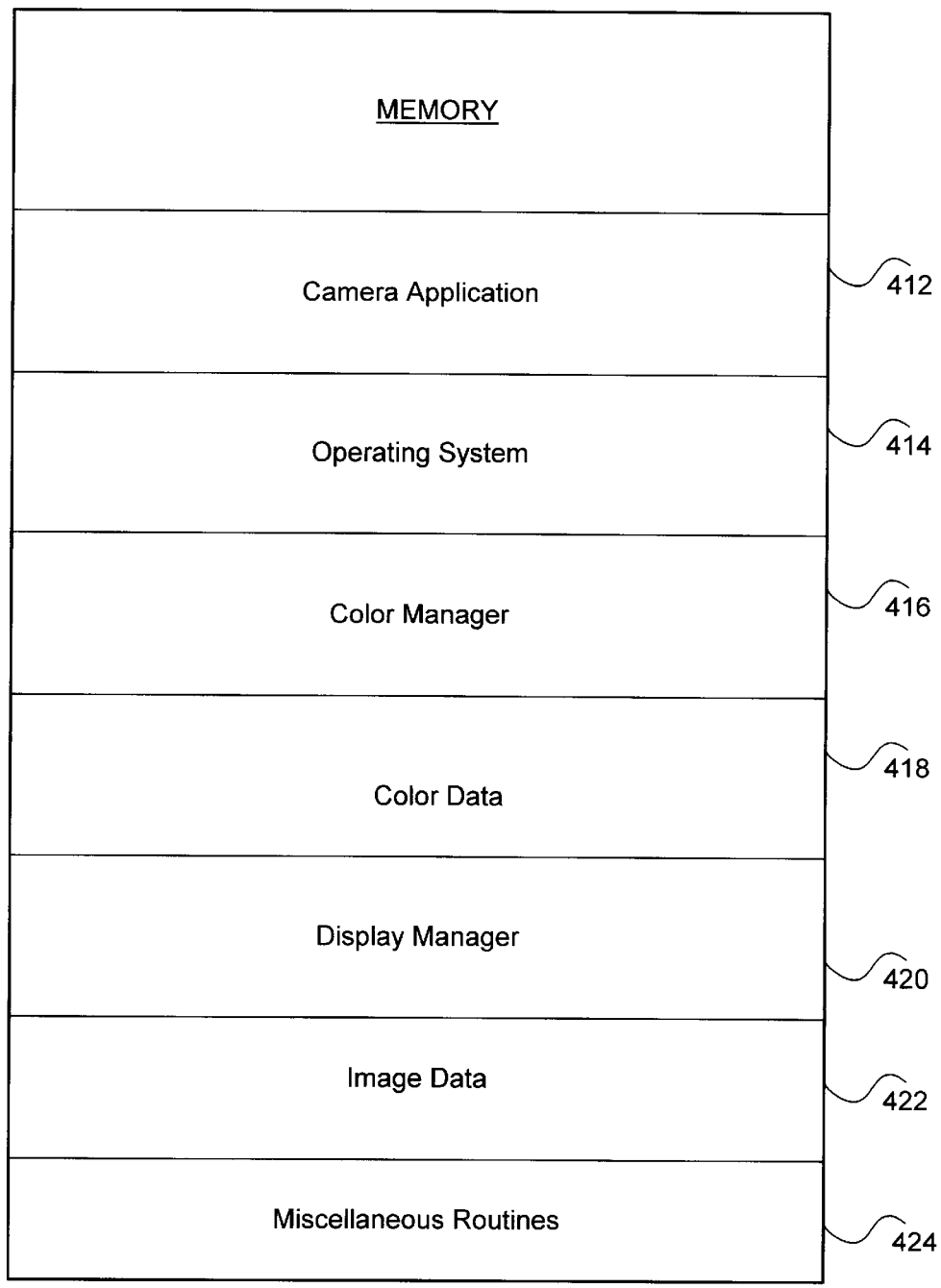
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may preferably include, but is not limited to, a camera application 412, an operating system 414, a color manager 416, color data 418, a display manager 420, and image data 422, and miscellaneous routines 424. In alternate embodiments, memory 346 may readily include various other components in addition to, or instead of, those components discussed in conjunction with the FIG. 4 embodiment.

In the FIG. 4 embodiment, camera application 412 may include program instructions that are preferably executed by CPU 344 (FIG. 3) to perform various functions and operations for camera device 110. The particular nature and functionality of camera application 412 preferably varies depending upon factors such as the type and particular use of the corresponding camera device 110.

In the FIG. 4 embodiment, operating system 414 preferably controls and coordinates low-level functionality of camera device 110. In accordance with the present invention, color manager 416 may preferably control and coordinate a white balance operation for image data 422 captured by camera device 110. In the FIG. 4 embodiment, color data 418 may include any relevant information relating to the foregoing white balance operation or other color management functions of camera device 110. The operation and utilization of color manager 416 is further discussed below in conjunction with FIGS. 5 through 11.

Display manager 420 preferably coordinates and controls the presentation of appropriate visual information on viewfinder 308 in response to instructions from application software 412. In the FIG. 4 embodiment, image data 422 may preferably be implemented and configured to provide a local memory for storing one or more sets of captured image data and other information.

Miscellaneous routines 424 may include any desired software instructions to facilitate functions performed by camera device 110. For example, miscellaneous routines 418 may include a data transformation routine that translates an initial format of captured image data 422 into a second format of the same image data that is compatible with various downstream processing modules.

Figure 5:
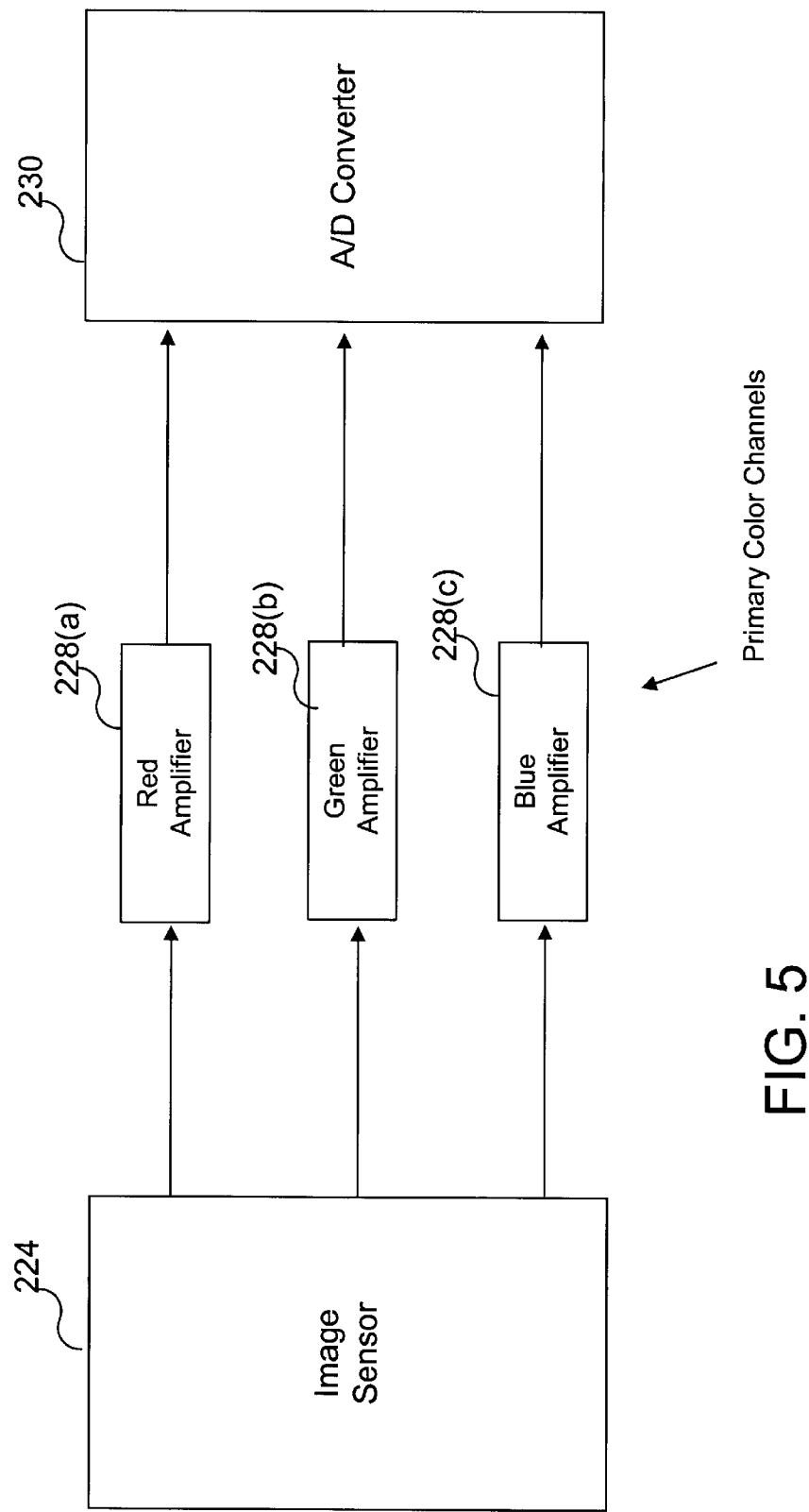
FIG. 5 is a block diagram for one embodiment of the red, green, and blue amplifiers of FIG. 2, in accordance with the present invention.

Referring now to FIG. 5, a block diagram of the FIG. 2 red, green, and blue amplifiers 428 is shown, in accordance with one embodiment of the present invention. In alternate embodiments of the present invention, red, green, and blue amplifiers 428 may readily be implemented to include various other configurations, and may also include various items and components that are different from those discussed in conjunction with the FIG. 5 embodiment. For example, in certain embodiments, red, green, and blue amplifiers 428 may readily be implemented in other locations in camera device 110, such as following A/D converter 230.

In the FIG. 5 embodiment, image sensor 224 may preferably generate a red sensor output to a red amplifier 228($a$) which may responsively provide an amplified red output to A/D converter 230. Red amplifier 228($a$) may preferably adjust the signal amplitude of the red sensor output according to a red amplification value referred to herein as red gain. Similarly, image sensor 224 may preferably generate a green sensor output to a green amplifier 228($b$) which may responsively provide an amplified green output to A/D converter 230. Green amplifier 228($b$) may preferably adjust the signal amplitude of the green sensor output according to a green amplification value referred to herein as green gain.

In addition, image sensor 224 may preferably generate a blue sensor output to a blue amplifier 228(*c*) which may responsively provide an amplified blue output to A/D converter 230. Blue amplifier 228(*c*) may preferably adjust the signal amplitude of the blue sensor output according to a blue amplification value referred to herein as blue gain. In accordance with the present invention, image sensor 224 may be implemented using any appropriate image capture technology. Improved techniques for adjusting the respective gains of red, green, and blue amplifiers 428 in order to achieve an appropriate white balance for current lighting conditions is further discussed below in conjunction with FIGS. 6 through 11.

Figure 6:
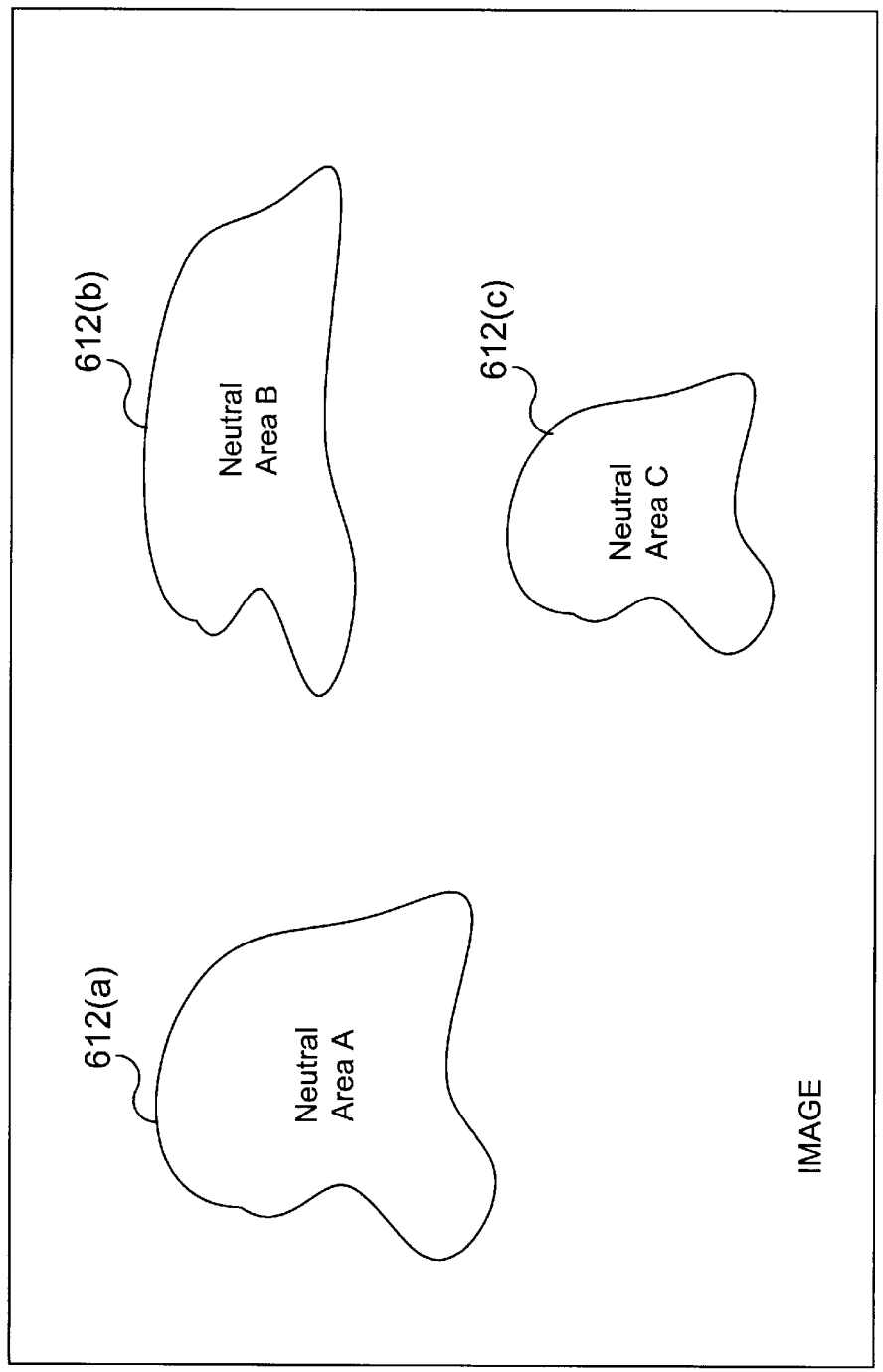
FIG. 6 is a block diagram for one embodiment of an exemplary image, in accordance with the present invention.

Referring now to FIG. 6, a block diagram for one embodiment of an exemplary image 610 is shown, in accordance with the present invention. In alternate embodiments of the present invention, image 610 may readily include various items and components other than those discussed in conjunction with the FIG. 6 embodiment. In the FIG. 6 embodiment, image data 422 corresponding to image 610 may preferably be captured by camera device 110 and stored into memory 346. In the FIG. 6 example, image 610 may preferably include, but is not limited to, a neutral area 612(*a*), a neutral area 612(*b*), and a neutral area 612(*c*).

A neutral area 612 may be identified in any appropriate and effective manner, and may generally include neutral colors (such as gray) and near-neutral colors that do not possess excessive amounts of highly-saturated color information. In the FIG. 6 embodiment, color manager 416 may preferably include a segmentation subroutine that may effectively identify neutral areas 612 in image 610.

In practice, color manager 416 may preferably restrict neutral areas 612 to regions of a substantially uniform color that also exceed a predetermined size threshold. For example, in certain embodiments, color manager 416 may preferably require neutral areas 612 to contain at least one percent of the total number of pixels in image 610. Color manager 416 may therefore calculate a total pixel count for each neutral area 612. In addition, color manager 416 may preferably require neutral areas 612 to exhibit certain color characteristics. For example, in the FIG. 6 embodiment, color manager 416 may exclude black regions and near-white regions of image 610 from neutral areas 612.

In addition, color manager 416 may preferably exclude regions in image 610 that exceed a pre-determined saturation threshold that may be set with relation to an absolute neutral gray reference value. For example, if the color saturation of a given region of image 610 differs from an absolute neutral reference standard by more than the foregoing saturation threshold, then color manager 416 may preferably identify the given region as not being a neutral area 612. In one embodiment, for a captured region of image 610 that was illuminated by noonday sun and is encoded using 8-bit binary code values in a conventional L*a*b* color space representation, the chromaticity of a neutral area 612 preferably may fall within the limits of an absolute value of a*<64 and an absolute value of b*<64. The corresponding luminance limitations may be 15<L*<240 for 8-bit binary values. In alternate embodiments, the present invention may utilize any other number of binary bit values. In addition, the present invention may also utilize any other tristimulus color space representation, instead of the L*a*b* representation discussed in conjunction with FIG. 6.

In the FIG. 6 embodiment, in addition to the foregoing procedures, color manager 416 may also perform various other analytical procedures on neutral areas 612. For example, color manager 416 may preferably calculate one or more color values corresponding to each neutral area 612. In certain embodiments, color manager 416 may preferably calculate a red/green color value (R/G value) for a given neutral area 612 by dividing a total red pixel count for the neutral area 612 by a total green pixel count for the same neutral area 612. Similarly, color manager 416 may preferably calculate a blue/green color value (B/G value) for a given neutral area 612 by dividing a total blue pixel count for the neutral area 612 by a total green pixel count for the same neutral area 612. The utilization of the foregoing color values and neutral areas 612 are further discussed below in conjunction with FIGS. 7 through 11.

Figure 7:
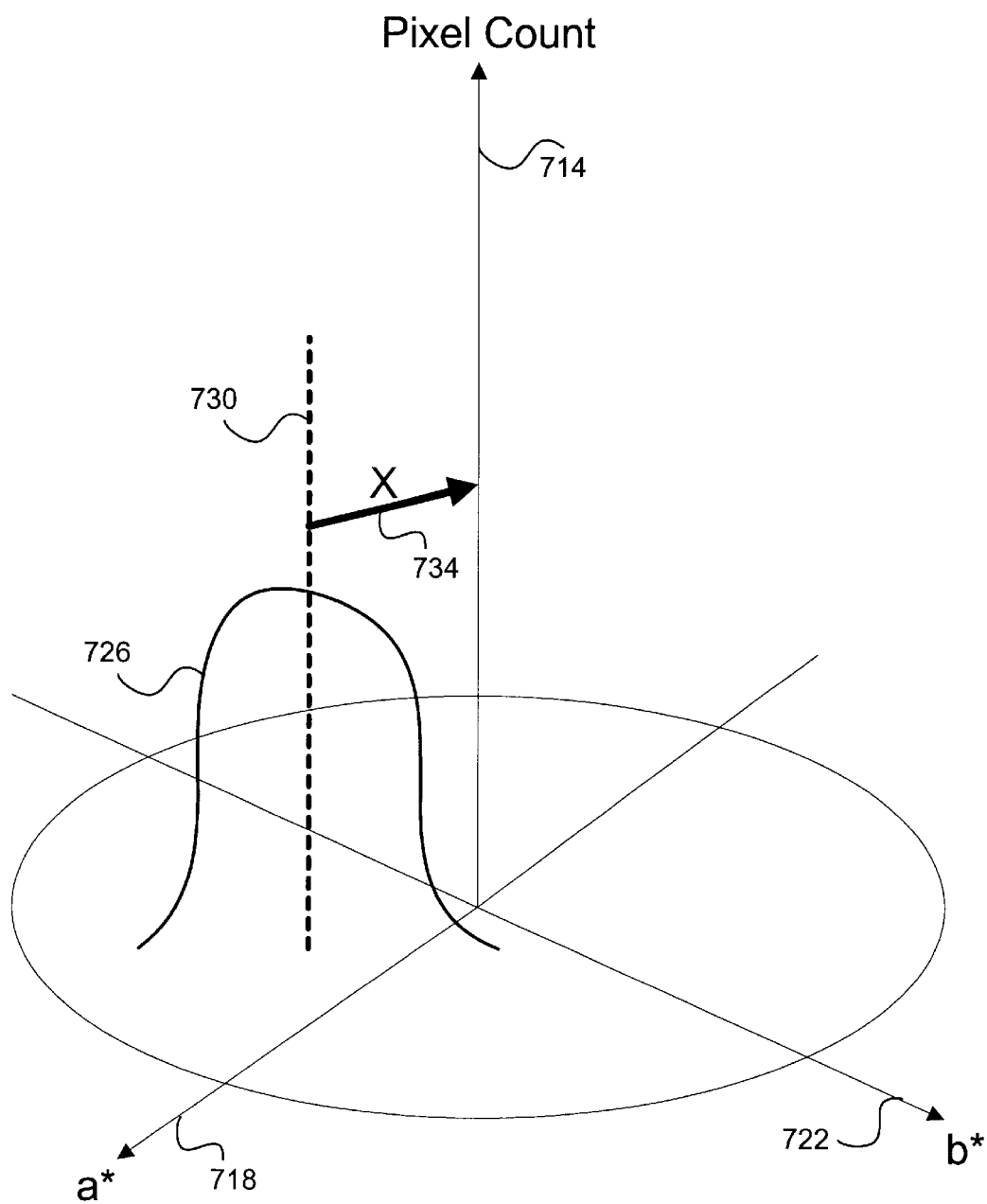
FIG. 7 is a block diagram of an exemplary histogram, in accordance with one embodiment of the present invention.

Referring now to FIG. 7, a block diagram of an exemplary histogram 710 is shown, in accordance with one embodiment of the present invention. In alternate embodiments of the present invention, histogram 710 may readily be implemented to include various other configurations, and may also include various items and components that are different from those discussed in conjunction with the FIG. 7 embodiment.

In the FIG. 7 embodiment, histogram 710 may preferably be implemented as a three-dimensional histogram that is similar to a conventional L*a*b* color-space representation with a horizontal "a*" axis 718 (green to magenta), a horizontal "b*" axis 722 (yellow to blue), and a vertical pixel count axis 714 (analogous to the luminance axis "L*" in a conventional L*a*b* color space representation). The intersection of axis 718 and axis 722 along axis 714 may represent an absolute neutral reference standard as discussed above in conjunction with FIG. 6.

After color manager 416 preferably identifies neutral areas 612 and calculates corresponding color values representing each neutral area 612 in a given image 610 (see foregoing FIG. 6), then color manager 416 may preferably combine these color values to produce one or more composite color values that represent all neutral areas 612 in a given image 610. Color manager 416 may determine the foregoing composite color value in any appropriate and effective manner.

In the FIG. 7 embodiment, color manager 416 may preferably plot pixels from the identified neutral areas 612 of image 610 onto histogram 710 to thereby produce a representation of the combined color information from the neutral areas 612. In the FIG. 7 example, a "color bin" 726 on histogram 710 may represent the combined pixel values and color information for identified neutral areas 612 from a given image 610. In accordance with the present invention, a single relatively large color bin 726 that is offset from absolute neutral axis 714 may indicate that the corresponding image 610 may require a white-balance operation due to a color cast effect from a particular illuminant type or other factors. Alternately, if a number of smaller color bins are formed in histogram 710, and if the smaller color bins are relatively equal in dispersion around absolute neutral axis 714, then no color cast may be present in the corresponding image 610, and a white-balance operation may not be required.

In the FIG. 7 embodiment, color manager 416 may preferably calculate a centroid value or chromaticity vector 730 that represents the composite color information of color bin 726. From the chromaticity vector 730, color manager 416 may then determine a correction vector "X" 734 that represents a color cast in image 610, and that is based upon the identified neutral areas 612 of image 610. In order to compensate for the foregoing color cast, color manager 416 may advantageously adjust appropriate parameters or information in camera device 110 to thereby align chromaticity vector 730 with absolute neutral reference axis 714 (along correction vector X 734).

Color manager 416 may utilize any appropriate techniques for combining color information for neutral areas 612 to produce a composite color representation or chromaticity vector 730 for image 610. For example, in one embodiment, color manager 416 may preferably calculate an average R/G value and an average R/G value for all neutral areas 416, based upon the R/G values and B/G values discussed above in conjunction with FIG. 6. Alternately, color manager 416 may set the chromaticity vector 730 equal to the R/G value and the B/G value of the largest single neutral area 612 in image 610. In addition, color manager 416 may calculate chromaticity vector 730 by taking a weighted average of R/G values and a weighted average of R/G values for all neutral areas 416 in image 610, where the various individual weighting values are equal to, or proportional to, the total pixel counts for the respective neutral areas 612.

In alternate embodiments, color manager 416 may readily determine a composite color value for all neutral areas 612 of image 610 using any other effective technique. For example, color manager 416 may perform a series of mathematical calculations on color data 418 in memory 346 to thereby determine a composite color value. In addition, color manager 416 may utilize other representations such as a R/G versus B/G graph or a red/blue/green (RGB) color space to represent and identify a color cast in image 610. It should therefore be noted that R/G and B/G are just one example of how chromaticity may be measured, and other methods of representing chromaticity are equally within the scope of the present invention.

After determining a composite color value for neutral areas 612 of image 610, color manager 416 may preferably determine one or more corresponding color correction factors based upon the composite color values to thereby adjust various parameters or data in camera device 110 and compensate for a color cast in image 610. Color manager 416 may utilize any effective method or technique to calculate the foregoing color correction factors, or to otherwise adjust white-balance characteristics of camera device 110. One technique for calculating color correction factors and adjusting camera device 110 is further discussed below in conjunction with the FIG. 8 embodiment.

Figure 8:
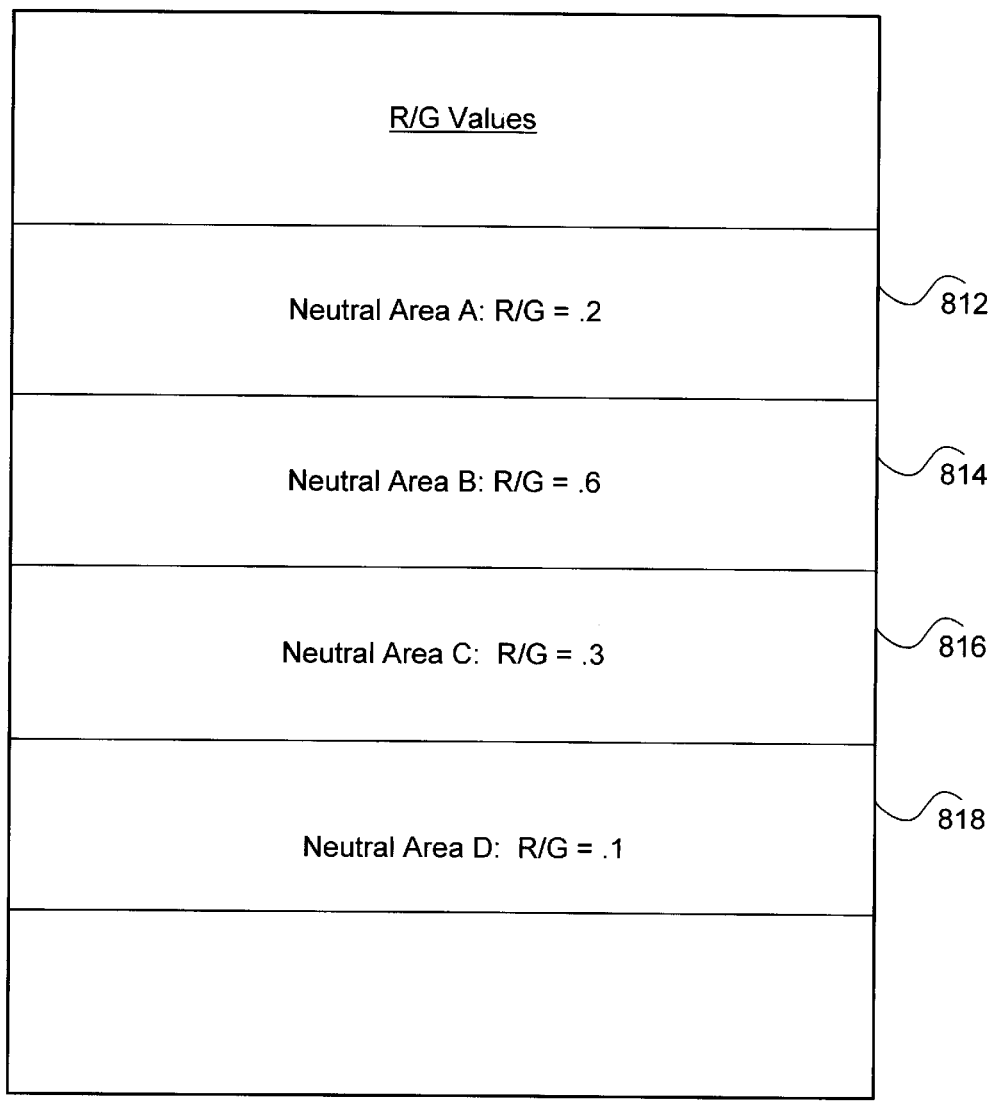
FIG. 8 is a diagram of exemplary R/G values, in accordance with one embodiment of the present invention.

Referring now to FIG. 8, a diagram for one embodiment of exemplary R/G values 810 is shown, in accordance with of the present invention. In the FIG. 8 embodiment, exemplary R/G values 810 may include, but are not limited to, a R/G value 812 for neutral area A that is equal to 0.2, a R/G value 814 for neutral area B that is equal to 0.6, a R/G value 816 for neutral area C that is equal to 0.3, and a R/G value 818 for neutral area D that is equal to 0.1. In alternate embodiments of the present invention, R/G values 810 may readily be implemented to include various other configurations, and may also include various items and components that are different from those discussed in conjunction with the FIG. 8 embodiment.

In the FIG. 8 embodiment, R/G values 810 may be calculated by color manager 416 as discussed above in conjunction with FIG. 6, and may be stored in memory 346 as part of color data 418. As discussed above in conjunction with the FIG. 7 embodiment, color manager 416 may then preferably utilize R/G values 810 to calculate a composite R/G value that may be combined with a similar composite B/G value for determining a composite color value or chromaticity vector 730 representing the neutral areas 612 of image 610.

For purposes of illustration, in the FIG. 8 example, color manager 416 may preferably exclude the R/G value 816 of 0.6 because the R/G value 816 of 0.6 may preferably exceed the pre-determined saturation threshold for neutral areas 612 that is discussed above in conjunction with FIG. 6. Color manager 416 may then preferably calculate a composite R/G value of 0.2 for image 610 by averaging R/G value 812 (0.2), R/G value 816 (0.3), and R/G value 818 (0.2).

In the FIG. 8 embodiment, color manager 416 may next determine a corresponding red color correction factor equal to 5 for red amplifier 228(a) (FIG. 5) by taking the reciprocal of the foregoing composite R/G value (0.2). Color manager 416 may then adjust the amplifier gain of red amplifier 228(a) to be equal to the calculated red color correction factor of 5 to thereby compensate corresponding white balance parameters of camera device 110. Color manager 416 may similarly use corresponding B/G values from the same neutral areas 612 of image 610 to calculate a blue color correction factor by taking the reciprocal of a composite B/G value. Color manager 416 may then adjust the amplifier gain of blue amplifier 228(c) to be equal to the calculated blue color correction factor to thereby complete a white-balance operation for camera device 110.

Figure 9:
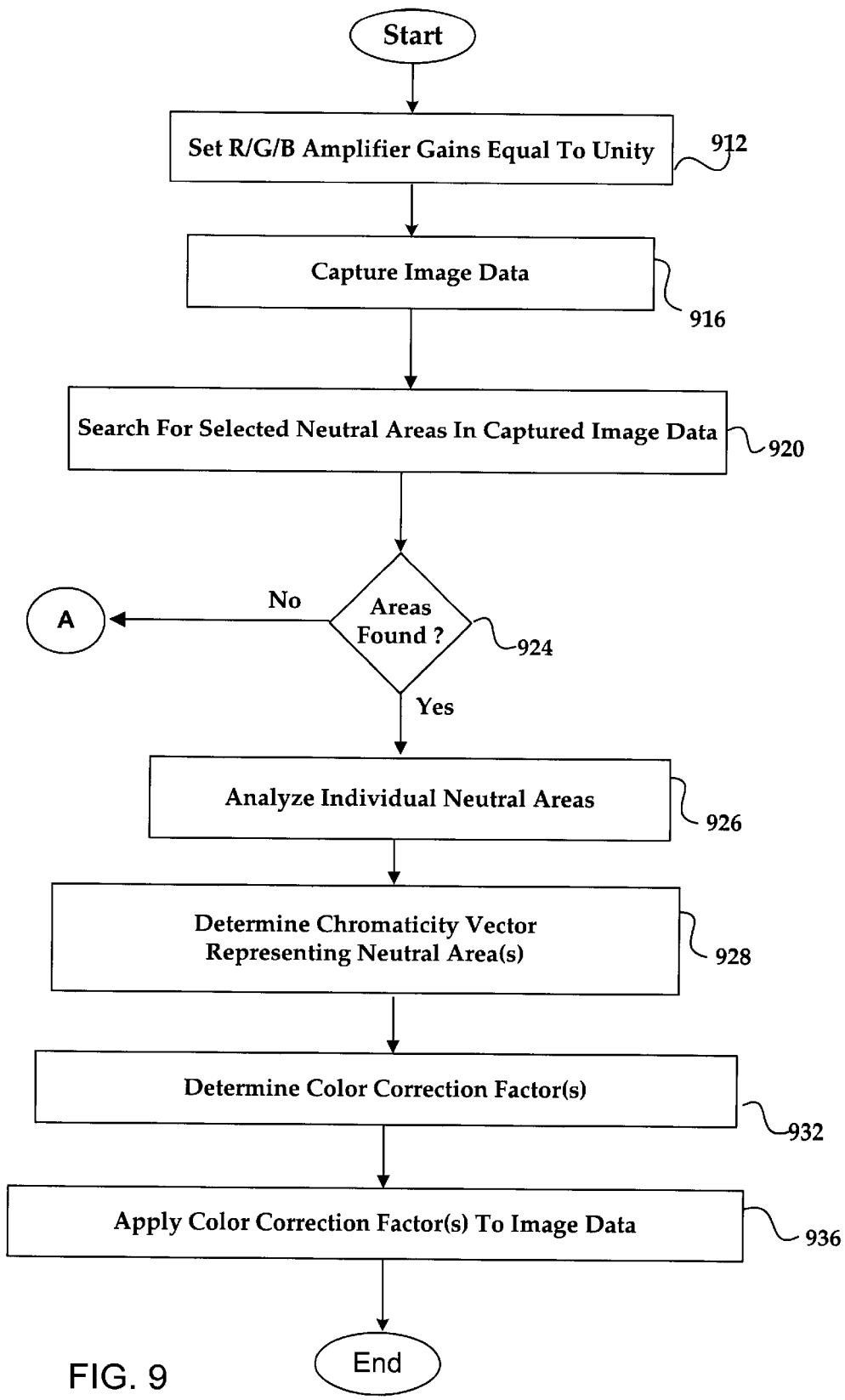
FIG. 9 is a flowchart of method steps for performing a white balance operation, in accordance with one embodiment of the present invention.

Referring now to FIG. 9, a flowchart of method steps for performing a white balance operation is shown, in accordance with one embodiment of the present invention. The FIG. 9 embodiment is presented for purposes of illustration, and in alternate embodiments, the present invention may readily utilize various other steps and sequences than those discussed in conjunction with the FIG. 9 embodiment.

In the FIG. 9 embodiment, in step 912, camera device 110 may preferably set amplifier gains of red, green, and blue amplifiers 228 equal to unity (an amplifier gain equal to 1). Then, in step 916, camera device 110 preferably captures image data 422 using capture subsystem 114. In step 920, a segmentation subroutine of color manager 416 may preferably search for selected neutral areas 612 in the captured image data according to pre-determined criteria, as discussed above in conjunction with FIG. 6. In step 924, color manager 416 may preferably determine whether qualified neutral areas 612 exist in image 610.

If neutral areas 612 are not identified by color manager 416 in step 924, then the FIG. 9 process preferably may proceed to letter "A" which is also the starting point for a memory color procedure that is discussed below in conjunction with FIG. 11. However, if color manager 416 identified one or more neutral areas 612 in image 610, then in step 926, color manager 416 may preferably analyze the individual neutral areas 612, as discussed above in conjunction with FIG. 6, to thereby determine relevant information such as a total pixel count for each neutral area 612 and one or more representative color values for each neutral area 612.

In step 928, color manager 416 may preferably determine a composite color value or a chromaticity vector 730 that represents color information for neutral areas 612 in image 610, as discussed above in conjunction with FIG. 7. Then, in step 932, color manager 416 may preferably determine one or more appropriate color correction factors based upon the foregoing composite color value, to thereby adjust white-balance parameters of camera device 110, as discussed above in conjunction with FIGS. 7 and 8.

Finally, in step 936, color manager 416 and camera device 110 may preferably apply the foregoing color correction factors to appropriate camera functionality (such as adjusting the amplifier gains of the red and blue amplifiers 228 of FIG. 5) to thereby compensate for color cast artifacts in image data 422.

In alternate embodiments, color manager 416 may alternately be embodied in a computer device that accesses and compensates for white-balance deviations in captured image data 422 by utilizing the principles and techniques of the present invention. In addition, in certain embodiments, color manager 416 may perform the foregoing procedures reiteratively by repeatedly evaluating image data 422 and responsively adjusting appropriate white-balance parameters of camera device 110.

Figure 10:
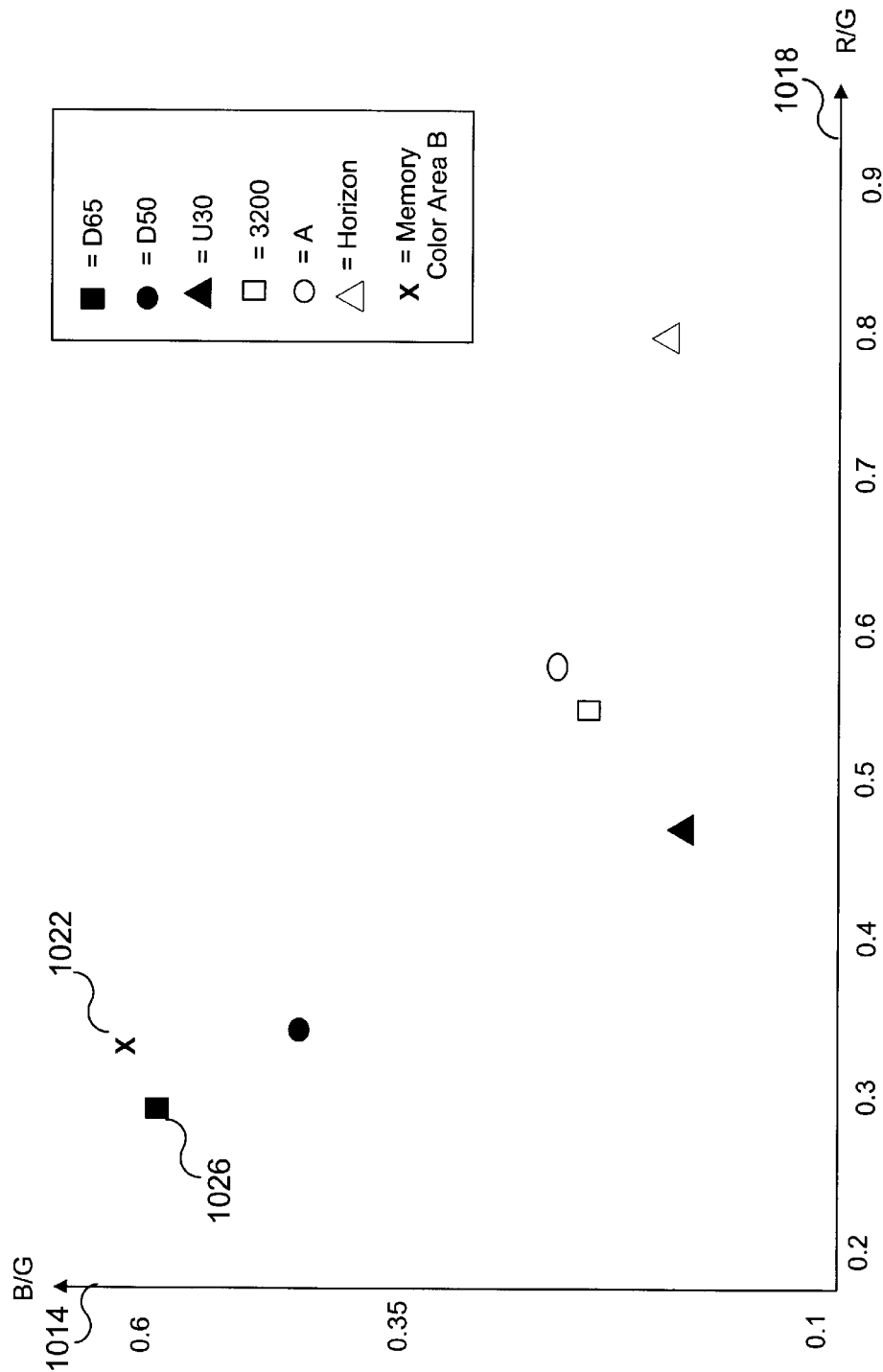
FIG. 10 is a graph of exemplary memory color coordinates, in accordance with one embodiment of the present invention.

Referring now to FIG. 10, a graph of exemplary memory color coordinates 1010 is shown, in accordance with one embodiment of the present invention. In alternate embodiments of the present invention, memory color coordinates 1010 may readily include other coordinates in various other configurations that are different from those discussed in conjunction with the FIG. 10 embodiment.

As discussed above in conjunction with FIG. 9, if color manager 416 fails to locate or identify neutral areas 612 in image 610, then color manager 416 may advantageously perform a memory color procedure for image 610. In alternate embodiments, color manager 416 may readily perform the memory color procedure of FIG. 11 as a separate procedure, instead of initially attempting to locate neutral areas 612 in image 610, as discussed above in conjunction with FIG. 9.

In the FIG. 10 embodiment, a memory color may include one or more colors corresponding to any specified photographic target area that may be found in image 610. For example, in various embodiments, memory colors may be associated with target objects such as foliage, sky, water, or human skin tones. In certain embodiments, however, human skin tones or other appropriate designated memory colors may be subject to a limited correction factor adjustment.

In the FIG. 10 example, the graph of exemplary memory color coordinates 1010 preferably includes a horizontal axis 1018 of R/G values for a foliage memory color in an image 610. The FIG. 10 graph of exemplary memory color coordinates 1010 also includes a vertical axis 1014 of B/G values for a foliage memory color in an image 610. The FIG. 10 graph also includes known memory color coordinates 1010 for the foliage memory color under various illuminants as empirically-determined and stored in a memory color table that may preferably be stored in memory 346 as a part of color data 418 (see FIG. 4).

In FIG. 10, known memory color coordinates 1010 of a foliage memory color are shown for illuminants that include D65 (midafternoon sunlight with slight overcast/6500 degrees Kelvin), D50 (noonday sunlight/5000 degrees Kelvin), U30 (fluorescent lighting), 3200 (studio floodlights/3200 degrees Kelvin), A (tungsten incandescent lighting), and horizon (late afternoon sunlight). In addition, image data coordinates (1022) for a memory color area A from image 610 are also shown in FIG. 10.

In accordance with one embodiment of the present invention, color manager 416 may preferably compare one or more image data coordinates 1022 with known memory color coordinates 1010 to identify a closest matching known coordinate. In the FIG. 10 embodiment, color manager 416 may preferably identify the known memory color coordinate for D65 as the closest matching known coordinate 1026 based on its closest proximity to image data coordinate 1022.

Color manager 416 may then preferably reference the foregoing memory color tables to determine known color values (such as B/G and R/G values discussed in conjunction with FIGS. 6 and 9) for the closest matching known coordinate 1026. Color manager 416 may then advantageously calculate corresponding color correction values for image 610 based upon the substituted known color values from the closest matching known coordinate 1026, instead of utilizing the original memory color values from the image data coordinates 1022. One embodiment for performing such a memory color procedure is discussed below in conjunction with FIG. 11.

Figure 11:
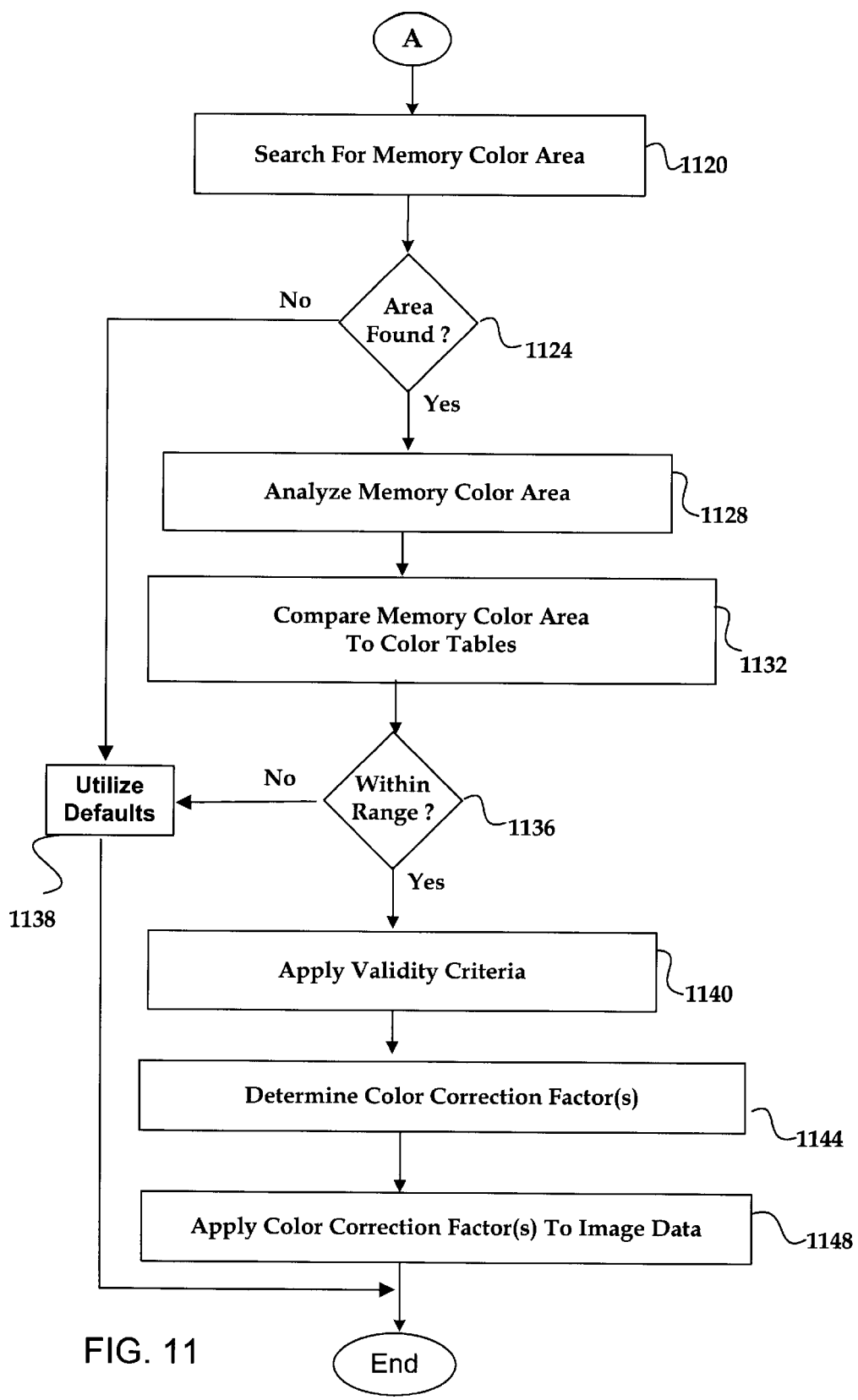
FIG. 11 is a flowchart of method steps for performing a memory color operation, in accordance with one embodiment of the present invention.

Referring now to FIG. 11, a flowchart of method steps for performing a memory color operation is shown, in accordance with one embodiment of the present invention. The FIG. 11 embodiment is presented for purposes of illustration, and in alternate embodiments, the present invention may readily utilize various other steps and sequences than those discussed in conjunction with the FIG. 11 embodiment.

In the FIG. 11 embodiment, in step 1120, color manager 416 may preferably search for one or more potential memory color areas in image 610 using any appropriate and effective techniques. In the FIG. 11 embodiment, color manager 416 may utilize similar techniques to those discussed above in conjunction with FIGS. 6 and 9 for locating neutral areas 612 in image 610. For example, color manager 416 may identify regions in image 610 that exhibit a substantially uniform color and that are above a certain size threshold. However, in the FIG. 11 embodiment, color manager 416 may preferably utilize a color memory size threshold that is greater than the foregoing size threshold utilized for locating neutral areas 612. For example, in certain embodiments, color manager 416 may require that a memory color area be over five percent of the total pixels from image 610.

In step 1124, color manager 416 may preferably determine whether a potential memory color area is located in image 610. If no potential memory color area is located in image 610, then in step 1138, color manager 416 may preferably utilize appropriate selectable system defaults to provide color correction factors for performing a white-balancing procedure for camera device 110. For example, color manager 416 may utilize manufacturer default settings or may utilize values from one or more preceding white-balancing procedures in camera device 110.

In foregoing step 1124, if a potential memory color area is located in image 610, then in step 1128, color manager 416 may preferably analyze the memory color area to obtain various types of relevant information. For example, color manager 416 may determine one or more memory color values for the potential memory color area. In certain embodiments, the foregoing memory color values may preferably include a R/G value and a B/G value, as discussed above in conjunction with FIGS. 6 and 9.

In step 1132, color manager 416 may preferably compare the foregoing memory color values to a color table with known color values for various memory colors under various illuminants, as discussed above in conjunction with FIG. 10. In step 1136, color manager 416 may preferably determine whether the foregoing memory color values of the potential memory color area are within a pre-determined range of a known color value for a particular memory color under a particular illuminant. If the memory color values of the potential memory color area are not within a pre-determined range of a known color value, then the FIG. 11 process may preferably proceed to step 1138 to utilize appropriate default values, as discussed above in conjunction with step 1124.

However, if the memory color values of the potential memory color area are within a pre-determined range of a known color value, then in step 1140, color manager 416 may preferably utilize various types of validity criteria to verify that the potential memory color area is a valid choice. The foregoing validity criteria may include any effective means for evaluating a potential memory color area. For example, color manager 416 may perform various memory color location tests, such as ensuring that a potential sky memory color area is near the top of image 610. In addition, color manager 416 may also perform various illuminant tests, such as ensuring that a potential outdoor memory color is not matched with an indoor illuminant such as fluorescent lighting.

Color manager 416 may thus make a final identification of a memory color area in image 610 only after a potential memory color area passes all validity testing procedures. In step 1144, color manager 416 may then advantageously determine one or more correction factors based upon the identified memory color area in image 610 by utilizing any appropriate and effective means.

In the FIG. 11 embodiment, color manager 416 may preferably associate the identified memory color area from image 610 with a closest matching known memory color 1026 from the foregoing color tables, as discussed above in conjunction with FIG. 10. In accordance with the present invention, color manager 416 may then reference the color tables to determine known color values for the closest matching known memory color 1026. In the FIG. 11 embodiment, the known color values for the closest matching known memory color 1026 may preferably include a R/G value and a B/G value that are similar to those color values discussed above in conjunction with FIGS. 6 and 9.

Color manager 416 may then substitute the foregoing known color values for the closest matching known memory color 1026 to calculate one or more correction values, instead of utilizing the original color values of the identified memory color area from image 610. Color manager 416 may calculate correction values in any effective manner. However, in the FIG. 11 embodiment, color manager 416 may preferably utilize a technique similar to that discussed above in conjunction with FIG. 10.

Finally, in step 1148, color manager 416 and camera device 110 may preferably apply the foregoing color correction factors to appropriate camera functionality (such as adjusting the amplifier gains of the red, green, and blue amplifiers 228 of FIG. 5) to thereby compensate for color cast artifacts in image data 422. The present invention therefore provides an improved method for effectively and efficiently generating white-balanced images in camera device 110 by utilizing color manager 416.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a white balancing operation, comprising:

an image sensor configured to capture image data corresponding to a photographic image; and a color manager configured to selectively identify one or more color areas from said image data, said color manager analyzing said one or more color areas to determine one or more color values corresponding to each of said one or more color areas, said color manager determining one or more color correction factors from said one or more color values for applying to said image data to thereby perform said white balancing operation.

2. The system of claim 1 wherein said image sensor and said color manager are implemented as part of an electronic camera device.

3. The system of claim 1 wherein said white balancing operation is performed to compensate for a color cast effect resulting an illuminant present when said image sensor captured said image data.

4. The system of claim 1 wherein said image sensor is implemented to include at least one of a charge-coupled device image sensor and another type of chromatic imaging sensor device.

5. The system of claim 1 wherein said one or more color areas include at least one of a near-neutral area and a memory color area.

6. The system of claim 1 wherein said one or more color values include a total red-over-green pixel value and a total blue-over-green pixel value for each of said color areas, said one or more color values alternately including other chromatic dual-component metrics.

7. The system of claim 1 wherein a camera device includes a red channel amplifier, a green channel amplifier, and a blue channel amplifier that each amplify a different color channel of said image data from said image sensor, said camera device initially setting a red channel amplifier gain, a green channel amplifier gain, and a blue channel amplifier gain equal to a unity value of 1, said red channel amplifier, said green channel amplifier, and said blue channel amplifier being alternately implemented as another configuration of primary color channels which include three or more color components.

8. The system of claim 7 wherein a capture subsystem of said camera device utilizes said image sensor to capture said image data.

9. The system of claim 8 wherein said color manager selectively searches for one or more neutral areas in said image data by utilizing a segmentation subroutine.

10. The system of claim 9 wherein said segmentation subroutine selectively identifies said one or more neutral areas as contiguous regions of said image data that are of a substantially uniform color, and that are in excess of a selectable neutral-area size threshold.

11. The system of claim 9 wherein said segmentation subroutine excludes neutral area candidates that are a black color, a near-white color, or in excess of a selectable color saturation threshold level.

12. The system of claim 9 wherein said color manager locates one or more of said neutral areas, and responsively calculates one or more of said color values to represent each of said neutral areas in said image data.

13. The system of claim 12 wherein said color values include a red-over-green pixel value and a blue-over-green pixel value for each of said neutral areas.

14. The system of claim 12 wherein said color manager determines one or more composite color values that represent said one or more neutral areas in said image data.

15. The system of claim 14 wherein said color manager plots said one or more color values for said one or more neutral areas on a three-dimensional color-space histogram for creating a composite chromaticity vector representing said one or more neutral areas, said color manager then comparing said composite chromaticity vector to an absolute neutral reference axis of said three-dimensional color-space histogram to thereby derive said one or more correction values.

16. The system of claim 14 wherein said one or more composite color values include a composite red-over-green pixel value and a composite blue-over-green pixel value that represent said one or more neutral areas in said image data.

17. The system of claim 14 wherein said color manager determines said one or more composite color values by performing at least one of an averaging method, a largest-area method, and a weighted average method, said averaging method calculating an average for all color values from all neutral areas, said largest-area method utilizing said one or more color values only from a largest neutral area in said image data, said weighted average method calculating a weighted average for all color values from all neutral areas by utilizing weighting values that are proportional to respective total pixel values for each of said one or more neutral areas.

18. The system of claim 14 wherein said color manager calculates said one or more correction values by utilizing said one or more composite color values.

19. The system of claim 18 wherein said color manager calculates a red gain correction factor by inverting a red-over-green composite color value, said color manager similarly calculating a blue gain correction factor by inverting a blue-over-green composite color value.

20. The system of claim 18 wherein said camera device applies said one or more color correction factors to said red channel amplifier and said blue channel amplifier to thereby complete said white balancing operation.

21. The system of claim 9 wherein said color manager fails to locate any of said one or more neutral areas in said image data, said color manager then searching for one or more memory color areas in said image data by utilizing said segmentation subroutine.

22. The system of claim 21 wherein said one or more memory color areas in said image data may include at least one of a sky area, a foliage area, a water area, and a skin tone area.

23. The system of claim 21 wherein said color manager fails to locate any of said one or more memory color areas in said image data, said color manager then responsively utilizing system defaults to perform said white balance operation, said system defaults including at least one of a manufacturer default and a prior image-capture setting.

24. The system of claim 21 wherein said color manager calculates one or more memory color values that represent said one or more memory color areas.

25. The system of claim 24 wherein said color manager compares said one or more memory color values of said one or more memory color areas to a color table of known memory color values for known memory colors captured under various known illuminants to thereby identify a closest matching known memory color.

26. The system of claim 25 wherein said color manager performs one or more validity tests on said one or more memory color areas to authenticate said one or more memory color areas.

27. The system of claim 25 wherein said validity tests include at least one of a positional validity test to analyze locations of said one or more memory color areas in said image data, and an illuminant validity test to analyze whether a proposed illuminant of said one or more memory color areas is appropriate for said one or more memory color areas.

28. The system of claim 25 wherein said color manager determines one or more known color values for said closest matching known memory color by referencing said color table.

29. The system of claim 28 wherein said color manager calculates said one or more color correction values for said image data by utilizing said one or more known color values for said closest matching known memory color.

30. The system of claim 29 wherein said camera device applies said one or more color correction factors to said red channel amplifier and said blue channel amplifier to thereby complete said white balancing operation.

31. A method for performing a white balancing operation, comprising the steps of:

capturing image data corresponding to a photographic image by utilizing an image sensor;

identifying one or more color areas from said image data by selectively utilizing a color manager, analyzing said one or more color areas with said color manager to determine one or more color values corresponding to each of said one or more color areas;

determining one or more color correction factors from said one or more color values by utilizing said color manager; and applying said one or more color correction factors to said image data to thereby complete said white balancing operation.

32. The method of claim 31 wherein said image sensor and said color manager are implemented as part of an electronic camera device.

33. The method of claim 31 wherein said white balancing operation is performed to compensate for a color cast effect resulting an illuminant present when said image sensor captured said image data.

34. The method of claim 31 wherein said image sensor is implemented to include at least one of a charge-coupled device image sensor and another type of chromatic imaging sensor device.

35. The method of claim 31 wherein said one or more color areas include at least one of a near-neutral area and a memory color area.

36. The method of claim 31 wherein said one or more color values include a total red-over-green pixel value and a total blue-over-green pixel value for each of said color areas, said one or more color values alternately including other chromatic dual-component metrics.

37. The method of claim 31 wherein a camera device includes a red channel amplifier, a green channel amplifier, and a blue channel amplifier that each amplify a different color channel of said image data from said image sensor, said camera device initially setting a red channel amplifier gain, a green channel amplifier gain, and a blue channel amplifier gain equal to a unity value of 1, said red channel amplifier, said green channel amplifier, and said blue channel amplifier being alternately implemented as another configuration of primary color channels which include three or more color components.

38. The method of claim 37 wherein a capture subsystem of said camera device utilizes said image sensor to capture said image data.

39. The method of claim 38 wherein said color manager selectively searches for one or more neutral areas in said image data by utilizing a segmentation subroutine.

40. The method of claim 39 wherein said segmentation subroutine selectively identifies said one or more neutral areas as contiguous regions of said image data that are of a substantially uniform color, and that are in excess of a selectable neutral-area size threshold.

41. The method of claim 39 wherein said segmentation subroutine excludes neutral area candidates that are a black color, a near-white color, or in excess of a selectable color saturation threshold level.

42. The method of claim 39 wherein said color manager locates one or more of said neutral areas, and responsively calculates one or more of said color values to represent each of said neutral areas in said image data.

43. The method of claim 42 wherein said color values include a red-over-green pixel value and a blue-over-green pixel value for each of said neutral areas.

44. The method of claim 42 wherein said color manager determines one or more composite color values that represent said one or more neutral areas in said image data.

45. The method of claim 44 wherein said color manager plots said one or more color values for said one or more neutral areas on a three-dimensional color-space histogram for creating a composite chromaticity vector representing said one or more neutral areas, said color manager then comparing said composite chromaticity vector to an absolute neutral reference axis of said three-dimensional color-space histogram to thereby derive said one or more correction values.

46. The method of claim 44 wherein said one or more composite color values include a composite red-over-green pixel value and a composite blue-over-green pixel value that represent said one or more neutral areas in said image data.

47. The method of claim 44 wherein said color manager determines said one or more composite color values by performing at least one of an averaging method, a largest-area method, and a weighted average method, said averaging method calculating an average for all color values from all neutral areas, said largest-area method utilizing said one or more color values only from a largest neutral area in said image data, said weighted average method calculating a weighted average for all color values from all neutral areas by utilizing weighting values that are proportional to respective total pixel values for each of said one or more neutral areas.

48. The method of claim 44 wherein said color manager calculates said one or more correction values by utilizing said one or more composite color values.

49. The method of claim 48 wherein said color manager calculates a red gain correction factor by inverting a red-over-green composite color value, said color manager similarly calculating a blue gain correction factor by inverting a blue-over-green composite color value.

50. The method of claim 48 wherein said camera device applies said one or more color correction factors to said red channel amplifier and said blue channel amplifier to thereby complete said white balancing operation.

51. The method of claim 39 wherein said color manager fails to locate any of said one or more neutral areas in said image data, said color manager then searching for one or more memory color areas in said image data by utilizing said segmentation subroutine.

52. The method of claim 51 wherein said one or more memory color areas in said image data may include at least one of a sky area, a foliage area, a water area, and a skin tone area.

53. The method of claim 51 wherein said color manager fails to locate any of said one or more memory color areas in said image data, said color manager then responsively utilizing system defaults to perform said white balance operation, said system defaults including at least one of a manufacturer default and a prior image-capture setting.

54. The method of claim 51 wherein said color manager calculates one or more memory color values that represent said one or more memory color areas.

55. The method of claim 54 wherein said color manager compares said one or more memory color values of said one or more memory color areas to a color table of known memory color values for known memory colors captured under various known illuminants to thereby identify a closest matching known memory color.

56. The method of claim 55 wherein said color manager performs one or more validity tests on said one or more memory color areas to authenticate said one or more memory color areas.

57. The method of claim 55 wherein said validity tests include at least one of a positional validity test to analyze locations of said one or more memory color areas in said image data, and an illuminant validity test to analyze whether a proposed illuminant of said one or more memory color areas is appropriate for said one or more memory color areas.

58. The method of claim 55 wherein said color manager determines one or more known color values for said closest matching known memory color by referencing said color table.

59. The method of claim 58 wherein said color manager calculates said one or more color correction values for said image data by utilizing said one or more known color values for said closest matching known memory color.

60. The method of claim 59 wherein said camera device applies said one or more color correction factors to said red channel amplifier and said blue channel amplifier to thereby complete said white balancing operation.

61. A computer-readable medium comprising program instructions for performing a white balancing operation by performing the steps of:

capturing image data corresponding to a photographic image by utilizing an image sensor;

identifying one or more color areas from said image data by selectively utilizing a color manager, analyzing said one or more color areas with said color manager to determine one or more color values corresponding to each of said one or more color areas;

determining one or more color correction factors from said one or more color values by utilizing said color manager; and applying said one or more color correction factors to said image data to thereby complete said white balancing operation.

62. A system for performing a white balancing operation, comprising:

means for capturing image data corresponding to a photographic image;

means for selectively identifying one or more color areas from said image data, means for analyzing said one or more color areas to determine one or more color values corresponding to each of said one or more color areas;

means for determining one or more color correction factors from said one or more color values; and means for applying said one or more color correction factors to said image data to thereby complete said white balancing operation.

63. A method for performing a white balancing operation by utilizing a camera device, comprising the steps of:

setting a red channel amplifier gain, a blue channel amplifier gain, and a green channel amplifier gain equal to unity;

capturing image data corresponding to a photographic image by utilizing an image sensor coupled to said camera device;

searching for one or more neutral color areas in said image data by selectively utilizing a color manager, analyzing said one or more neutral color areas with said color manager, if said one or more neutral color areas are located, to thereby determine one or more neutral color values corresponding to each of said one or more neutral color areas;

combining said one or more neutral color values with said color manager to produce one or more composite neutral color values;

determining one or more neutral color correction factors from said one or more neutral color values by utilizing said color manager;

searching for one or more memory color areas in said image data if none of said one or more neutral areas are located in said image data, analyzing said one or more memory color area with said color manager to determine one or more memory color values corresponding to said one or more neutral memory areas;

utilizing said color manager to reference a color table with said one or more memory color values to thereby identify one or more known memory color values for a closest matching known memory color;

determining said one or more color correction factors from said one or more known memory color values by utilizing said color manager; and applying said one or more color correction factors to said image data to thereby complete said white balancing operation.

64. A system for manipulating data, comprising:

an image sensor configured to capture image data corresponding to a photographic image; and a color manager configured to selectively identify one or more color areas from said image data, said color manager analyzing said one or more color areas to determine one or more color correction factors for applying to said image data to thereby complete a white balancing operation.

* * * * *